(12) United States Patent
Maki

(10) Patent No.: US 10,906,222 B2
(45) Date of Patent: Feb. 2, 2021

(54) INJECTION MOLDING MACHINE

(71) Applicant: FANUC CORPORATION, Yamanashi (JP)

(72) Inventor: Ikuhiro Maki, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/504,763

(22) Filed: Jul. 8, 2019

(65) Prior Publication Data

US 2020/0016809 A1  Jan. 16, 2020

(30) Foreign Application Priority Data

Jul. 12, 2018  (JP) ................................ 2018-132426

(51) Int. Cl.
*B29C 45/17* (2006.01)

(52) U.S. Cl.
CPC ................ *B29C 45/1774* (2013.01)

(58) Field of Classification Search
CPC .......................... B29C 45/1774; B23Q 1/0009
See application file for complete search history.

(56) References Cited

U.S. PATENT DOCUMENTS

| | | | | |
|---|---|---|---|---|
| 4,775,309 A | * | 10/1988 | Hehl | B29C 45/1756 425/135 |
| 4,976,598 A | * | 12/1990 | Hehl | B29C 45/1774 164/150.1 |
| 5,271,590 A | * | 12/1993 | Rosen | F16M 11/10 248/222.13 |
| 5,310,332 A | * | 5/1994 | Ito | B29C 45/1774 425/169 |
| 5,391,070 A | * | 2/1995 | Ito | B23Q 1/0009 425/135 |
| 5,559,531 A | * | 9/1996 | Schiffer | B29C 45/1774 345/168 |

(Continued)

FOREIGN PATENT DOCUMENTS

| CN | 1558274 A | 12/2004 |
|---|---|---|
| CN | 202491361 U | 10/2012 |

(Continued)

OTHER PUBLICATIONS

Notice of Reasons for Refusal issued by the Japanese Patent Office in relation to Japanese Application No. 2018-132426 dated Mar. 3, 2020 (3 pages) along with English language translation (3 pages).

(Continued)

*Primary Examiner* — Xiao S Zhao
*Assistant Examiner* — Emmanuel S Luk
(74) *Attorney, Agent, or Firm* — Robert P. Michal, Esq.; Carter, DeLuca & Farrell LLP

(57) ABSTRACT

An injection molding machine for molding a molded article includes a display device, and a support mechanism configured to support the display device on a molding machine body. The support mechanism includes a first bracket attached to the display device, a second bracket attached to the molding machine body, and a slider provided between the first bracket and the second bracket and configured to support the first bracket so as to be movable relative to the second bracket in a mold opening and closing direction.

4 Claims, 13 Drawing Sheets

(56) References Cited

U.S. PATENT DOCUMENTS

| | | | | |
|---|---|---|---|---|
| 10,429,404 | B2* | 10/2019 | Oouchi | G01P 1/07 |
| 2006/0261226 | A1* | 11/2006 | Petrick | F16M 11/10 |
| | | | | 248/274.1 |
| 2008/0165478 | A1* | 7/2008 | McCoy | F16M 11/08 |
| | | | | 361/729 |
| 2009/0200439 | A1* | 8/2009 | Bremmon | F16M 13/02 |
| | | | | 248/183.1 |
| 2010/0006716 | A1* | 1/2010 | Yen | F16M 11/10 |
| | | | | 248/125.1 |
| 2011/0089300 | A1* | 4/2011 | Walters | F16M 11/12 |
| | | | | 248/274.1 |
| 2011/0163052 | A1* | 7/2011 | Kim | F16M 11/046 |
| | | | | 211/49.1 |
| 2011/0174939 | A1* | 7/2011 | Taylor | F16M 11/10 |
| | | | | 248/201 |
| 2011/0315837 | A1* | 12/2011 | Mitsuhashi | G09F 7/18 |
| | | | | 248/201 |
| 2012/0043437 | A1* | 2/2012 | Townsend | F16M 11/10 |
| | | | | 248/205.1 |
| 2018/0133786 | A1 | 5/2018 | Amezawa et al. | |
| 2018/0311879 | A1* | 11/2018 | Grimm | B29C 45/76 |

FOREIGN PATENT DOCUMENTS

| | | |
|---|---|---|
| CN | 205590931 U | 9/2016 |
| CN | 107654812 A | 2/2018 |
| CN | 207205834 U | 4/2018 |
| JP | 2000185335 A | 7/2000 |
| JP | 2014145923 A | 8/2014 |
| JP | 2017170710 A | 9/2017 |
| JP | 2018-79485 A | 5/2018 |

OTHER PUBLICATIONS

Written Opinion issued by the Japanese Patent Office in relation to Japanese Application No. 2018-132426 dated Apr. 24, 2020 (1 pages) along with English language translation (2 pages).

Decision to Grant a Patent issued by the Japanese Patent Office in relation to Japanese Application No. 2018-132426 dated Jun. 9, 2020 (3 pages) along with English language translation (2 pages).

* cited by examiner

INJECTION MOLDING MACHINE

CROSS-REFERENCE TO RELATED APPLICATION

This application is based upon and claims the benefit of priority from Japanese Patent Application No. 2018-132426 filed on Jul. 12, 2018, the contents of which are incorporated herein by reference.

BACKGROUND OF THE INVENTION

Field of the Invention

The present invention relates to an injection molding machine for molding molded articles.

Description of the Related Art

Japanese Laid-Open Patent Publication No. 2018-079485 discloses an injection molding machine with a display device and an input device attached to a stationary platen.

SUMMARY OF THE INVENTION

In the technique of Japanese Laid-Open Patent Publication No. 2018-079485, there is a problem that electronic components in an electronic device are subjected to load when vibrations arising during operation of the injection molding machine are transmitted to the electronic device such as a display device and an input device.

The present invention has been devised to solve the above problem, it is therefore an object of the present invention to provide an injection molding machine capable of suppressing vibration transmitted to an electronic device.

An aspect of the present invention resides in an injection molding machine for molding a molded article, including: an electronic device; and a support mechanism configured to support the electronic device on a molding machine body, wherein the support mechanism includes: a first bracket attached to the electronic device; a second bracket attached to the molding machine body; and a slider provided between the first bracket and the second bracket and configured to support the first bracket so as to be movable relative to the second bracket in a mold opening and closing direction.

According to the present invention, vibration transmitted to the electronic device can be suppressed.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

First Embodiment

[Configuration of Injection Molding Machine]

Figure 1:
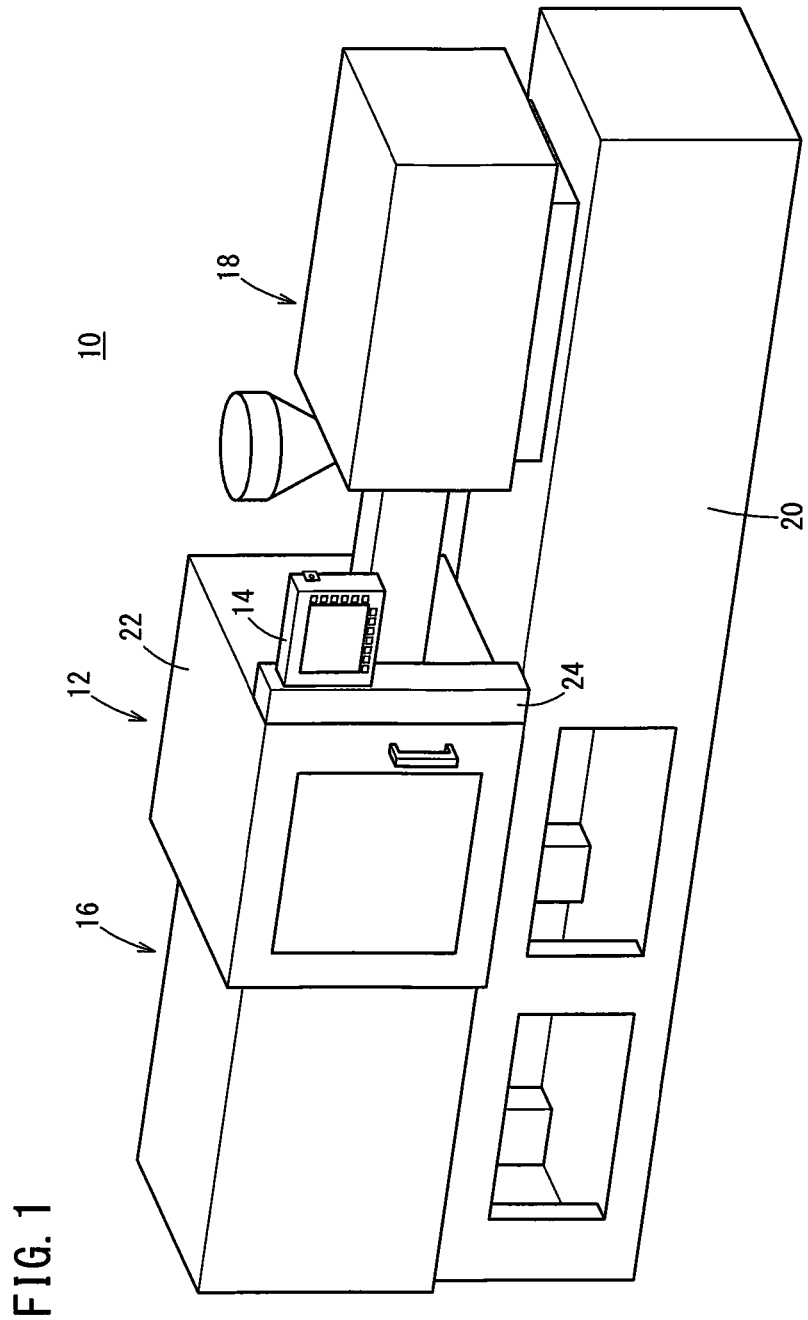
FIG. 1 is a schematic view of an injection molding machine.

FIG. 1 is a schematic view of an injection molding machine 10. The injection molding machine 10 includes a molding machine body 12 and a display device 14 attached to the molding machine body 12. The molding machine body 12 further includes a clamping unit 16 for opening and closing a mold and an injection unit 18 for injecting a resin material into the mold. The clamping unit 16 and the injection unit 18 are mounted on a machine base 20. A space where the mold of the clamping unit 16 opens and closes is covered by a safety door 22 which can be opened and closed in the mold opening/closing direction (mold opening and closing direction) by the user. The display device 14 is attached to a frame 24 set on the machine base 20.

[Configuration of Support Mechanism]

Figure 2:
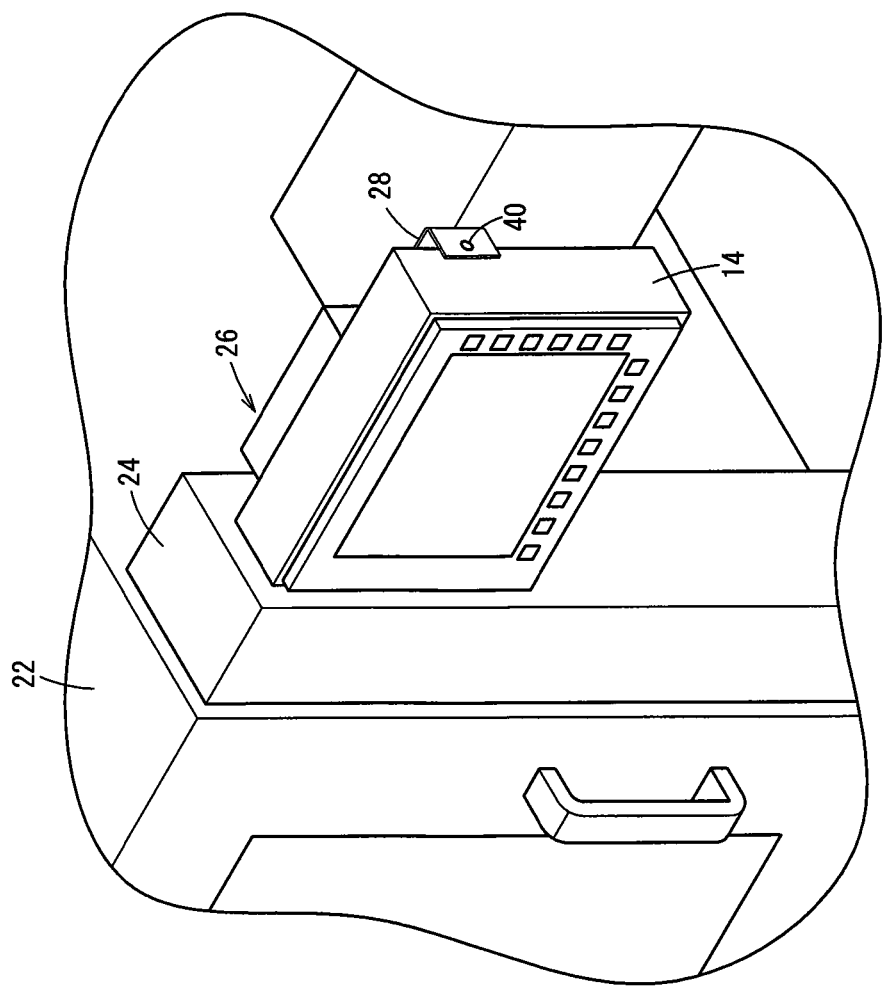
FIG. 2 is a perspective view of a display device attached to a frame as viewed from the front side.
Figure 3:
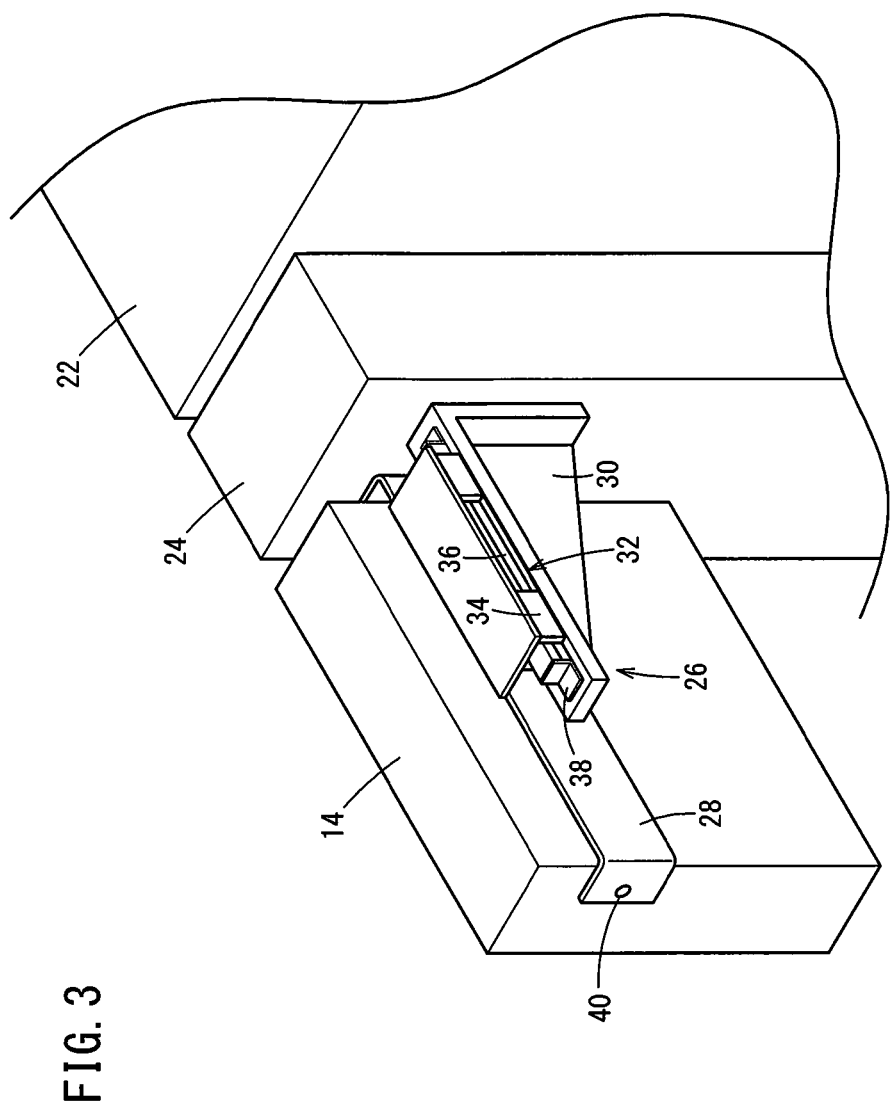
FIG. 3 is a perspective view of a display device attached to a frame as viewed from the rear side.

FIG. 2 is a perspective view of the display device 14 attached to the frame 24 as viewed from the front side. FIG. 3 is a perspective view of the display device 14 attached to the frame 24 as viewed from the rear side. The display device 14 is attached to the frame 24 by means of a support mechanism 26.

The support mechanism 26 has a first bracket 28 attached to the display device 14, a second bracket 30 attached to the frame 24, and a slider 32 arranged between the first bracket 28 and the second bracket 30.

The slider 32 has a carriage 34 attached to the first bracket 28 and a rail 36 attached to the second bracket 30. The rail 36 is arranged to extend in parallel with the mold opening/closing direction. The carriage 34 is provided to straddle the rail 36. Thus, the first bracket 28 is supported by the slider 32 so as to be movable in the mold opening/closing direction relative to the second bracket 30. Stoppers 38 are provided at both ends of the rail 36. The moving range of the first bracket 28 relative to the second bracket 30 is restricted by the stoppers 38. That is, the display device 14 is supported by the slider 32 so as to be movable relative to the molding machine body 12 within a predetermined range in the mold opening/closing direction.

A hinge 40 is provided at a position where the first bracket 28 is attached to the display device 14. The display device 14 is pivotally supported on the first bracket 28 by the hinge 40 about an axis extending in the mold opening/closing direction. Thus, the display device 14 can be pivoted by the support mechanism 26 about the axis extending in the mold opening/closing direction.

[Operation and Effect]

When vibrations generated during operation of the injection molding machine 10 are transmitted to the display device 14, there is a problem that load on electronic components in the display device 14 occurs.

Therefore, in the present embodiment, the display device 14 is configured to be supported by the support mechanism 26 having the slider 32 so as to be movable in the mold opening/closing direction relative to the molding machine body 12. As a result, it is possible to suppress the vibrations transmitted to the display device 14, and reduce the load on the electronic components in the display device 14.

Further, in the present embodiment, the slider 32 of the support mechanism 26 is provided with the stoppers 38 for restricting the moving range of the first bracket 28 relative to the second bracket 30. Owing thereto, drop-off of the display device 14 can be prevented.

Further, in the present embodiment, the hinge 40 for supporting the display device 14 is provided so as to allow the display device 14 to pivot about the axis extending in the mold opening/closing direction relative to the first bracket 28. Owing thereto, the user can tilt the display device 14 to such an angle that the user can easily view the display.

Second Embodiment

In the first embodiment, the display device 14 is attached to the frame 24 of the molding machine body 12, but in the second embodiment, an operation panel 42 with a display device 14 is attached to a stationary platen 44 of the molding machine body 12. The second embodiment differs from the first embodiment in the configuration of the support mechanism 26. The other configurations of the injection molding machine 10 are the same as those of the first embodiment.

[Configuration of Support Mechanism]

Figure 4:
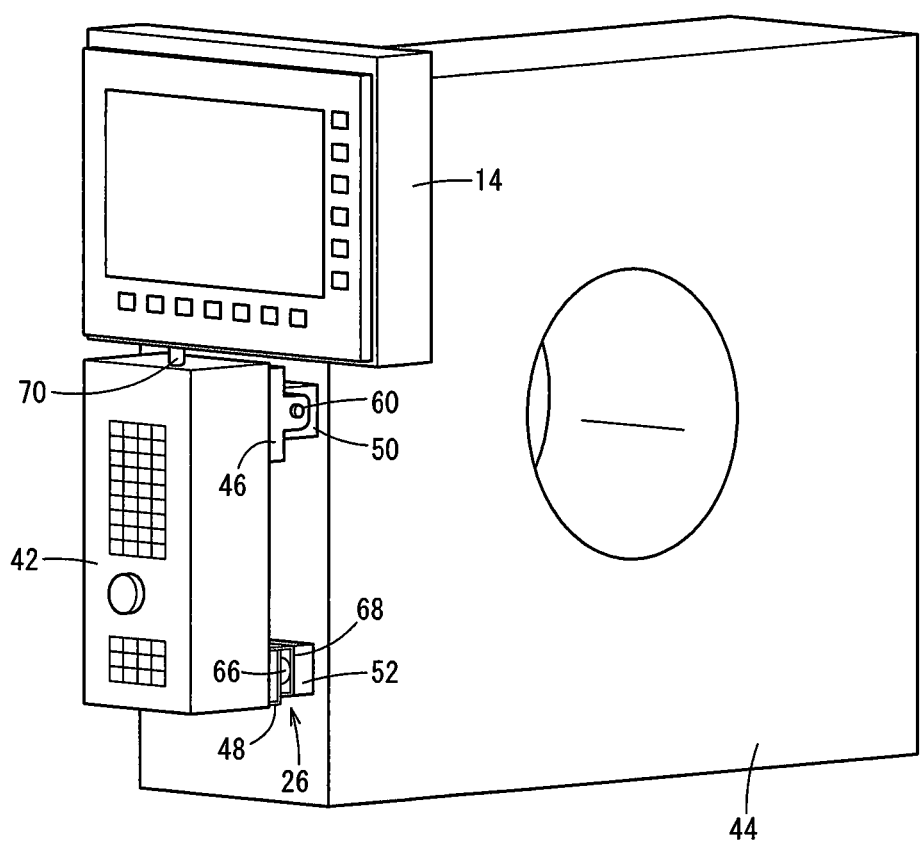
FIG. 4 is a perspective view of a display device and an operation panel attached to a stationary platen as viewed from the front side.
Figure 5:
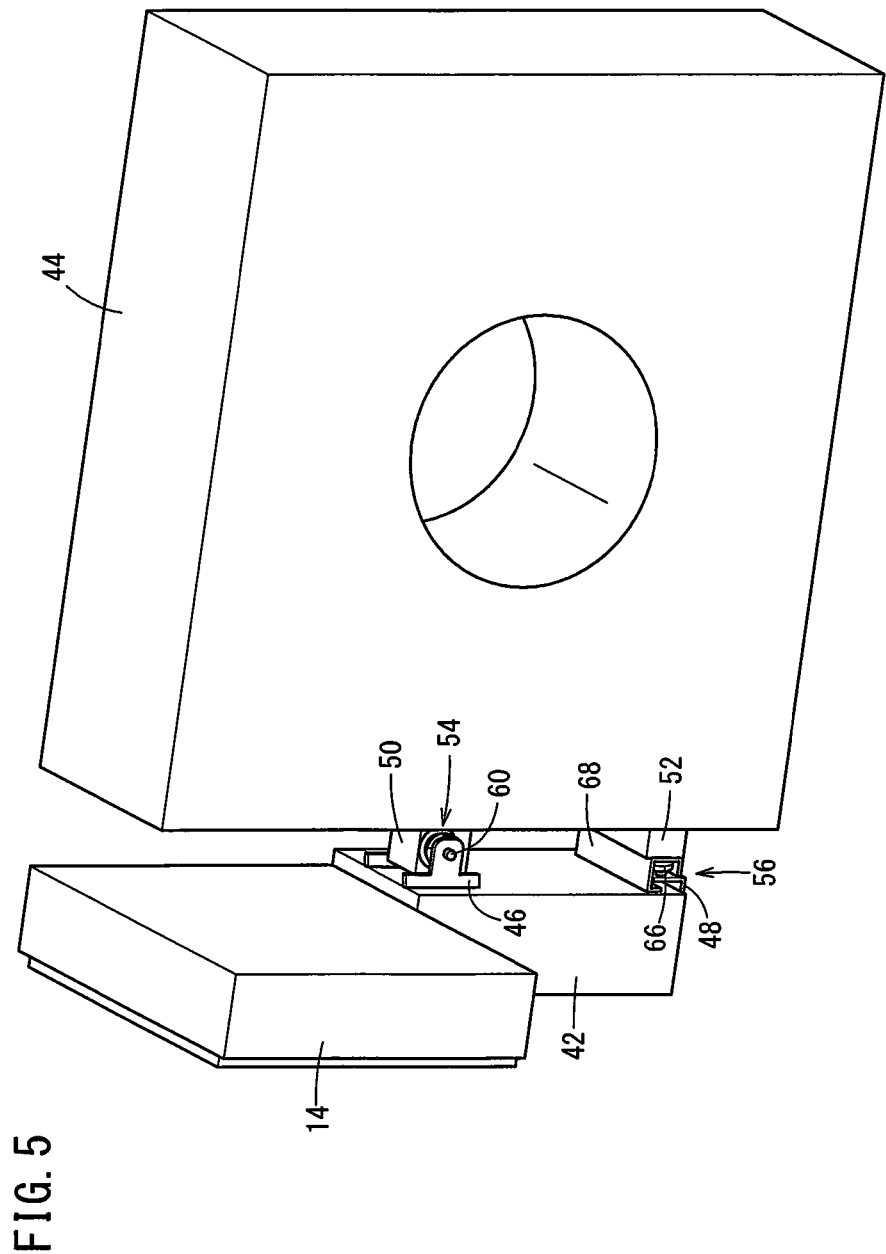
FIG. 5 is a perspective view of a display device and an operation panel attached to a stationary platen as viewed from the rear side.

FIG. 4 is a perspective view of the display device 14 and the operation panel 42 attached to a stationary platen 44 as viewed from the front side. FIG. 5 is a perspective view of the display device 14 and the operation panel 42 attached to the stationary platen 44 as viewed from the rear side.

The support mechanism 26 includes a first upper bracket 46 attached to the upper side of the operation panel 42 with respect to the direction of gravity, a first lower bracket 48 attached to the lower side of the operation panel 42 with respect to the direction of gravity, a second upper bracket 50 attached to the upper side of the stationary platen 44 with respect to the direction of gravity, and a second lower bracket 52 attached to the lower side of the stationary platen 44 with respect to the direction of gravity. The support mechanism 26 further includes an upper slider 54 provided between the first upper bracket 46 and the second upper bracket 50 and a lower slider 56 provided between the first lower bracket 48 and the second lower bracket 52.

Figure 6:
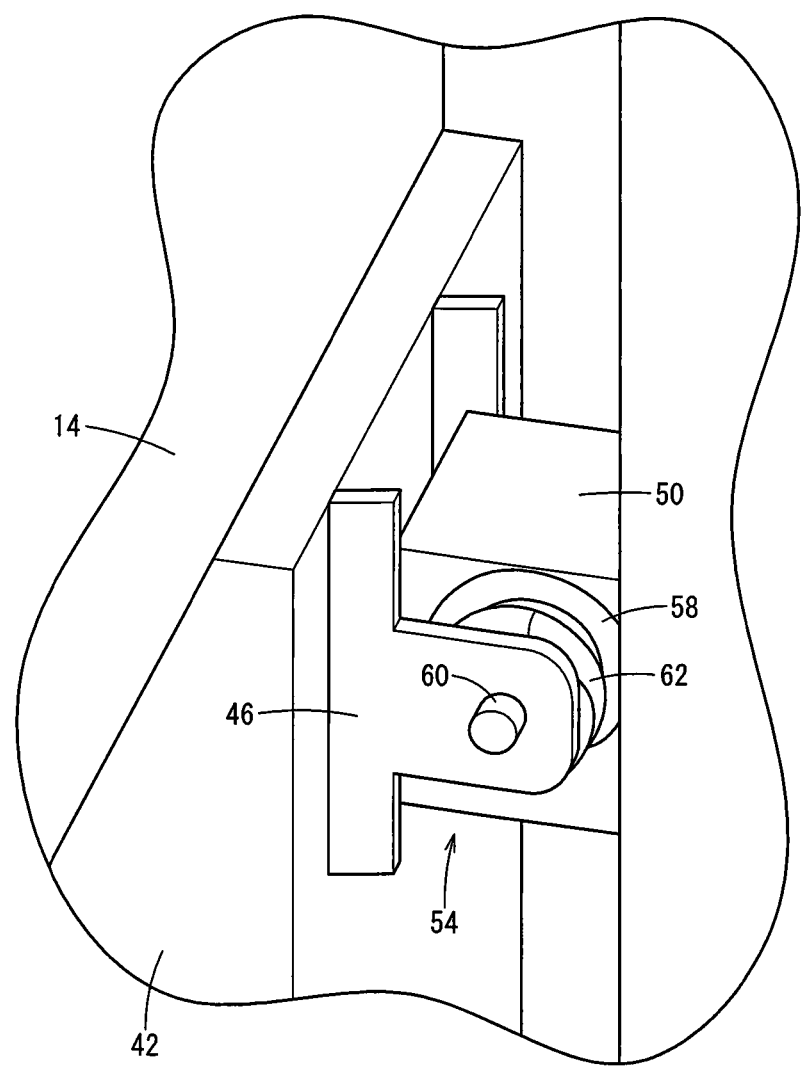
FIG. 6 is an enlarged perspective view of an upper slider.

FIG. 6 is an enlarged perspective view of the upper slider 54. The upper slider 54 includes a roller bush 58 press-fitted into a through hole of the second upper bracket 50, a shaft 60 inserted into the roller bush 58 and supported by the first upper bracket 46, and a rubber cushion 62 disposed between the roller bush 58 and the first upper bracket 46 and into which the shaft 60 is inserted.

The shaft 60 inserted in the roller bush 58 is provided so as to be movable in the mold opening/closing direction. With this configuration, the first upper bracket 46 is supported by the upper slider 54 so as to be movable in the mold opening/closing direction relative to the second upper bracket 50. Further, the moving range of the first upper bracket 46 and the shaft 60 relative to the second upper bracket 50 is restricted by the second upper bracket 50 and the rubber cushion 62.

Figure 7:
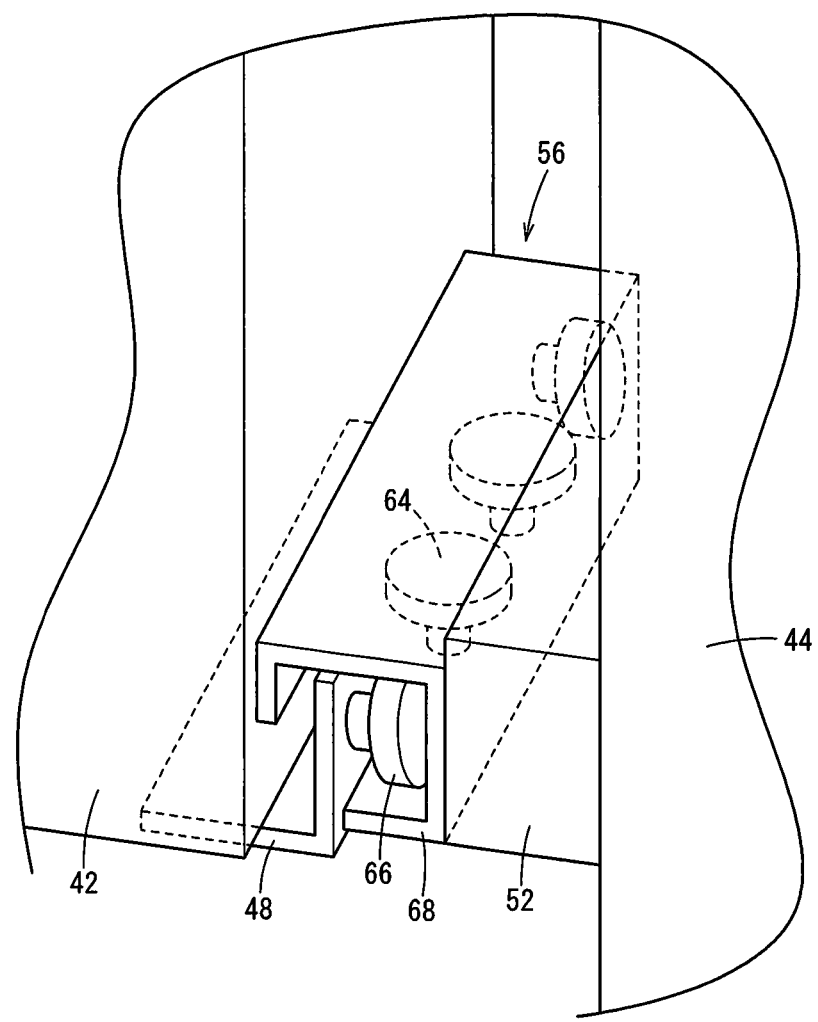
FIG. 7 is an enlarged perspective view of a lower slider.

FIG. 7 is an enlarged perspective view of the lower slider 56. The lower slider 56 includes front-rear support rollers 64 attached to the first lower bracket 48, vertical support rollers 66 attached to the first lower bracket 48, and a lower rail 68 attached to the second lower bracket 52. The front-rear support roller 64 is arranged so as to be rotatable about an axis extending in a direction substantially corresponding to the direction of gravity. The vertical support roller 66 is arranged so as to be rotatable about an axis extending in a direction substantially perpendicular to the rear surface of the operation panel 42. The lower rail 68 is arranged to extend parallel to the mold opening/closing direction. The front-rear support rollers 64 abut on or contact with a side surface of the lower rail 68 that extends downward in the direction of gravity, and receive a load acting in the direction (front-and-rear direction) from the front to the rear of the operation panel 42. The vertical support rollers 66 are in contact with a side surface of the lower rail 68 that extends in a direction perpendicular to the rear surface of the operation panel 42, and receive a load of the operation panel 42 acting in the direction of gravity (vertical direction). Thus, the first lower bracket 48 is supported by the lower slider 56 so as to be movable in the mold opening/closing direction relative to the second lower bracket 52.

As described above, the first upper bracket 46 is supported by the upper slider 54 so as to be movable in the mold opening/closing direction relative to the second upper bracket 50 while the first lower bracket 48 is supported by the lower slider 56 so as to be movable relative to the second lower bracket 52 in the mold opening/closing direction. Further, the moving range of the first upper bracket 46 relative to the second upper bracket 50 is restricted by the second upper bracket 50 and the rubber cushion 62. That is, the display device 14 is supported by the upper slider 54 and the lower slider 56 so as to be movable relative to the molding machine body 12 within a predetermined range in the mold opening/closing direction.

Figure 8:
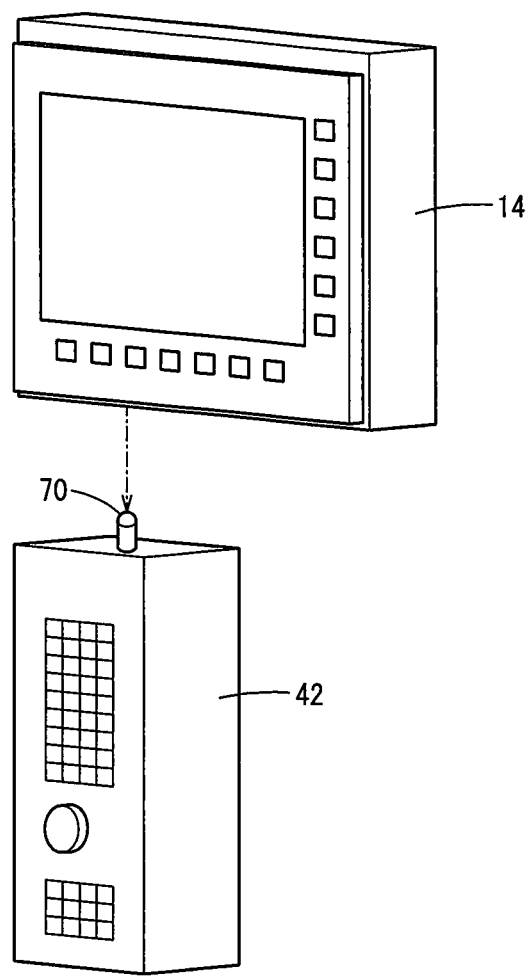
FIG. 8 is a schematic view for explaining an attachment structure of a display device to an operation panel.

FIG. 8 is a schematic view for explaining an attachment structure of the display device 14 to the operation panel 42. The operation panel 42 has a mounting shaft 70 on the top surface. An unillustrated shaft insertion hole is formed on the bottom surface of the display device 14, and the display device 14 is attached to the operation panel 42 by inserting the mounting shaft 70 into the shaft insertion hole. The display device 14 is pivotally supported on the operation panel 42 about the axis of the mounting shaft 70.

[Operation and Effect]

In the present embodiment, the display device 14 is supported together with the operation panel 42 by the support mechanism 26 relative to the molding machine body 12. This makes it possible to suppress the vibration transmitted to the display device 14 and the operation panel 42 which are electronic devices, and further to reduce the burden on the electronic components in the display device 14 and the operation panel 42.

Further, in the present embodiment, the display device 14 is provided on the operation panel 42 so as to be pivotable about the mounting shaft 70. Owing thereto, the user can turn the display device 14 to such an angle that the user can easily view the display.

Third Embodiment

The third embodiment differs from the first embodiment in the configuration of the support mechanism 26. The other configurations of the injection molding machine 10 are the same as that of the first embodiment.

[Configuration of Support Mechanism]

Figure 9:
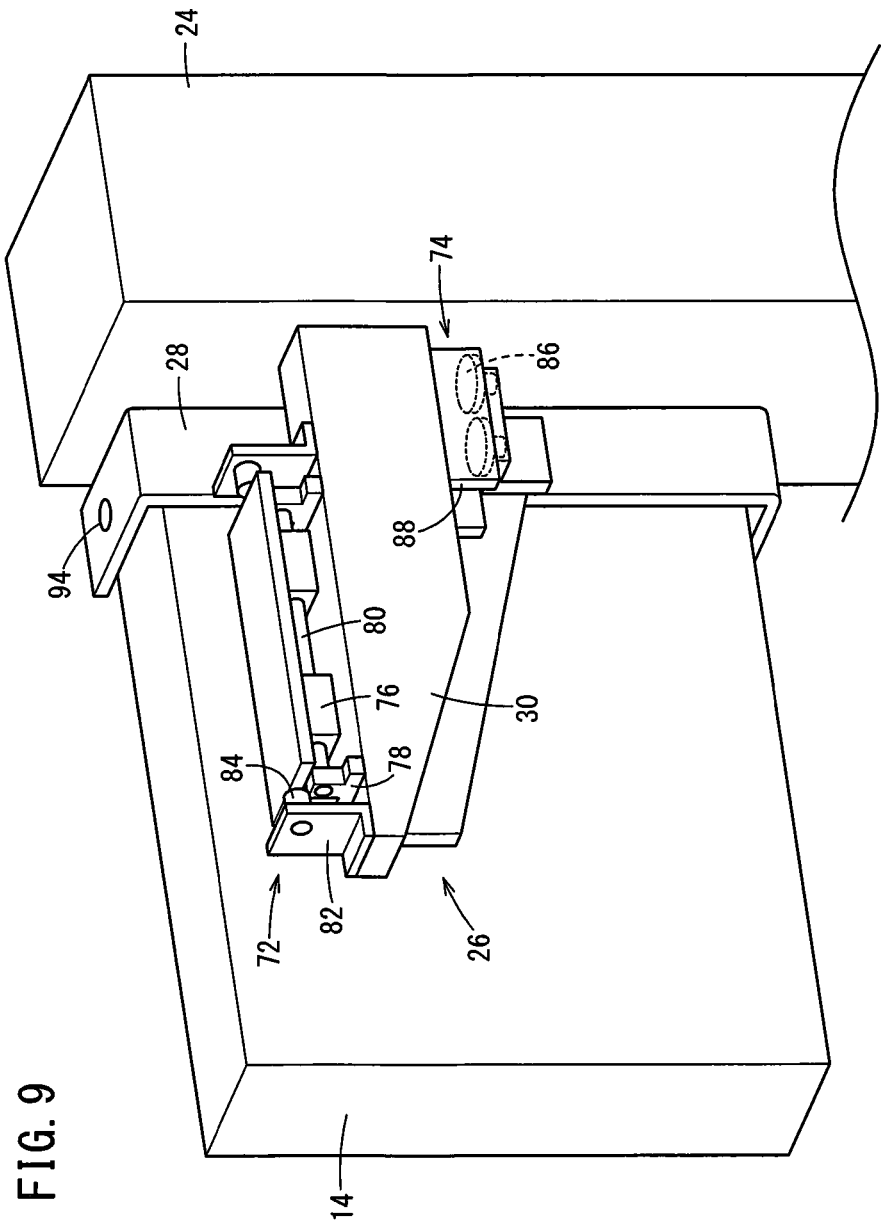
FIG. 9 is a perspective view of a display device attached to a frame as viewed from the rear side.
Figure 10:
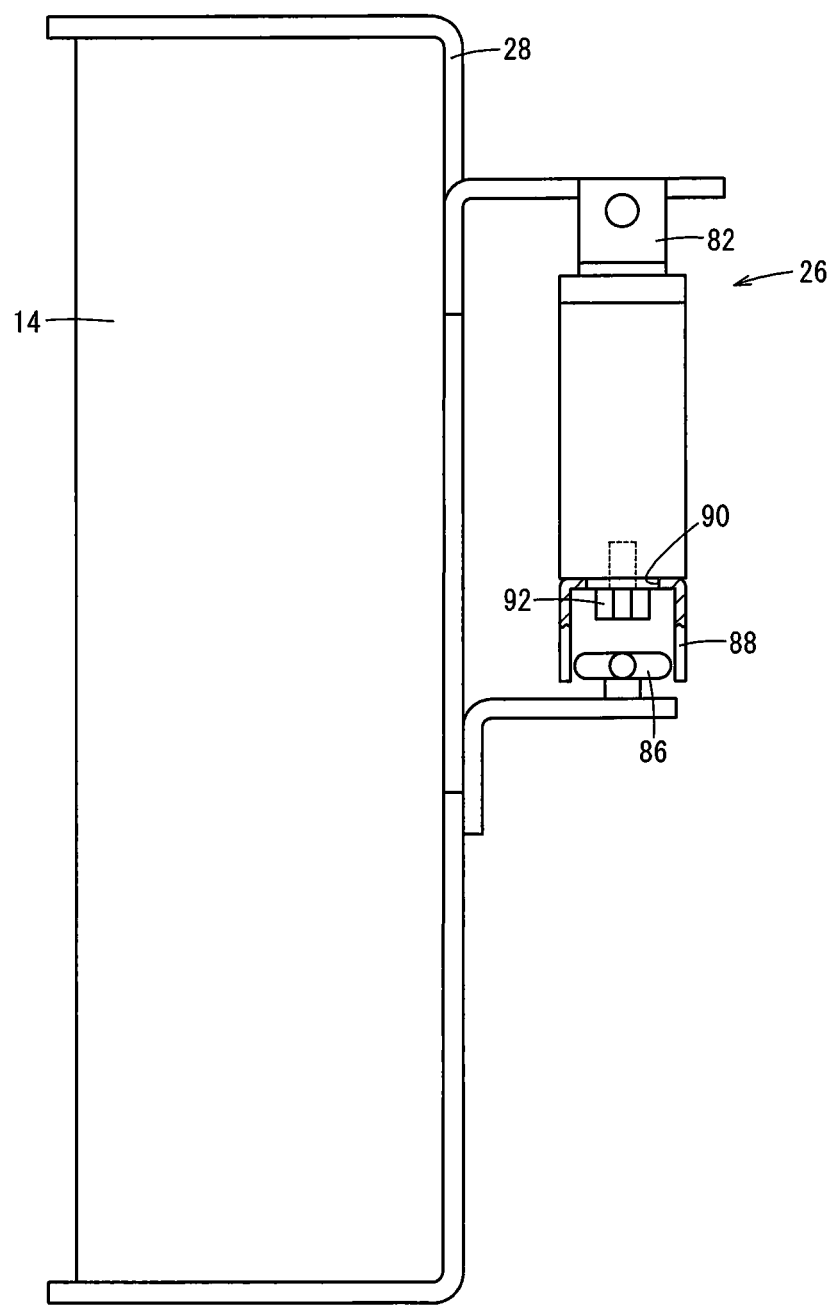
FIG. 10 is a side view of a display device and a support mechanism.
Figure 11:
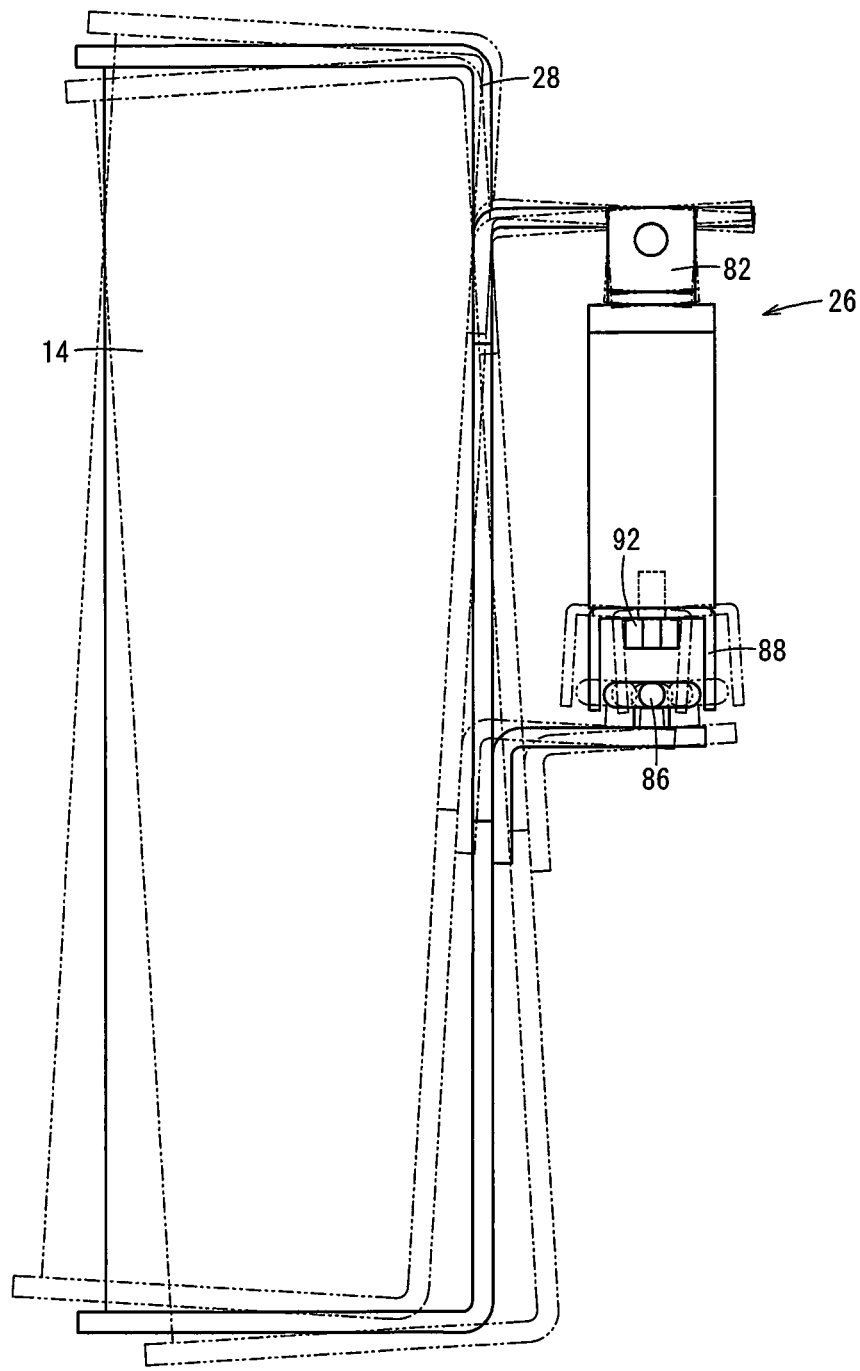
FIG. 11 is a side view of a display device and a support mechanism, showing a range in which the display device can be tilted.

FIG. 9 is a perspective view of a display device 14 attached to a frame 24 as viewed from the rear side. FIG. 10 is a side view of the display device 14 and a support mechanism 26. FIG. 11 is a side view of the display device 14 and the support mechanism 26, showing a range in which the display device 14 can be tilted.

The support mechanism 26 includes a first bracket 28 attached to the display device 14, a second bracket 30 attached to the frame 24, and further includes, between the first bracket 28 and the second bracket 30, an upper slider 72 arranged on the upper side and a lower slider 74 arranged on the lower side, with respect to the direction of gravity.

The upper slider 72 has carriages 76 attached to the first bracket 28, shaft brackets 78 attached to the top surface of the second bracket 30, and a shaft 80 attached to the shaft brackets 78.

The shaft 80 is arranged on the top surface of the second bracket 30 via the shaft brackets 78 so as to extend parallel to the mold opening/closing direction. The shaft 80 is inserted into the carriages 76, which are movable in the mold opening/closing direction along the shaft 80 and rotatable about the shaft 80. Thus, the first bracket 28 is relatively movable in the mold opening/closing direction with respect to the second bracket 30 by means of the upper slider 72, and is rotatably supported relative to the second bracket 30. A stopper 82 with a rubber cushion 84 attached thereto is arranged at each end of the shaft 80. The moving range of the first bracket 28 is restricted by the stoppers 82 and the rubber cushions 84.

The lower slider 74 includes front-rear support rollers 86 attached to the first bracket 28, and a lower rail 88 attached to the lower surface of the second bracket 30. The front-rear support roller 86 is provided rotatably about an axis extending in a direction substantially corresponding to the direction of gravity. The lower rail 88 is arranged to extend parallel to the mold opening/closing direction. The front-rear support rollers 86 abut on or are in contact with a side surface, extending downward in the direction of gravity, of the lower rail 88, and receive a load acting in the direction (front-and-rear direction) from the front to the rear of the display device 14. Thus, the first bracket 28 is supported so as to be movable in the mold opening/closing direction relative to the second bracket 30.

As described above, the first bracket 28 is supported by the upper slider 72 and the lower slider 74 so as to be movable in the mold opening/closing direction relative to the second bracket 30. Further, the moving range of the first bracket 28 relative to the second bracket 30 is restricted by the stoppers 82. That is, the display device 14 is supported by the upper slider 72 and the lower slider 74 so as to be movable relative to the molding machine body 12 within a predetermined range in the mold opening/closing direction.

The lower rail 88 is formed with a long hole 90 having a shape elongated in the direction from the front to the rear of the display device 14 (FIG. 10). A bolt 92 penetrates through the long hole 90 and is screw-engaged into the lower surface of the second bracket 30.

As described above, the first bracket 28 is supported by the upper slider 72 so as to be rotatable relative to the second bracket 30. That is, the display device 14 is supported by the upper slider 72 so as to be rotatable relative to the molding machine body 12. By loosening the bolt 92 and rotating the display device 14, the inclination is adjusted, and thereafter the user can fix the display device 14 to the second bracket 30 at a desired inclination by tightening the bolt 92 (FIG. 11). Here, the fixing member is not limited to the bolt 92 as long as it can fix the display device 14 to the second bracket 30 at a desired inclination. The bolt 92 constitutes a fastener member.

A hinge 94 is provided at a position where the first bracket 28 is attached to the display device 14. The display device 14 is supported on the first bracket 28 so as to pivot about an axis extending in the direction of gravity by means of the hinge 94. Thus, the display device 14 can be pivoted on the axis extending in the direction of gravity by the support mechanism 26.

[Operation and Effect]

In this embodiment, the display device 14 is supported by the upper slider 72 so as to be movable relative to the molding machine body 12 within a predetermined range of the mold opening/closing direction and so as to be rotatable about the axis that extends in the mold opening/closing direction. Furthermore, the display device 14 is fixed at a desired inclination by the bolt 92 of the lower slider 74. Thereby, the user can tilt the display device 14 at such an angle that the user can easily view it.

[Modification 1]

The support mechanism 26 is not limited to the above embodiments, and another support mechanism 26 described below may be used. The configuration of the injection molding machine 10 other than the support mechanism 26 is the same as that of the first embodiment.

[Configuration of Support Mechanism]

Figure 12:
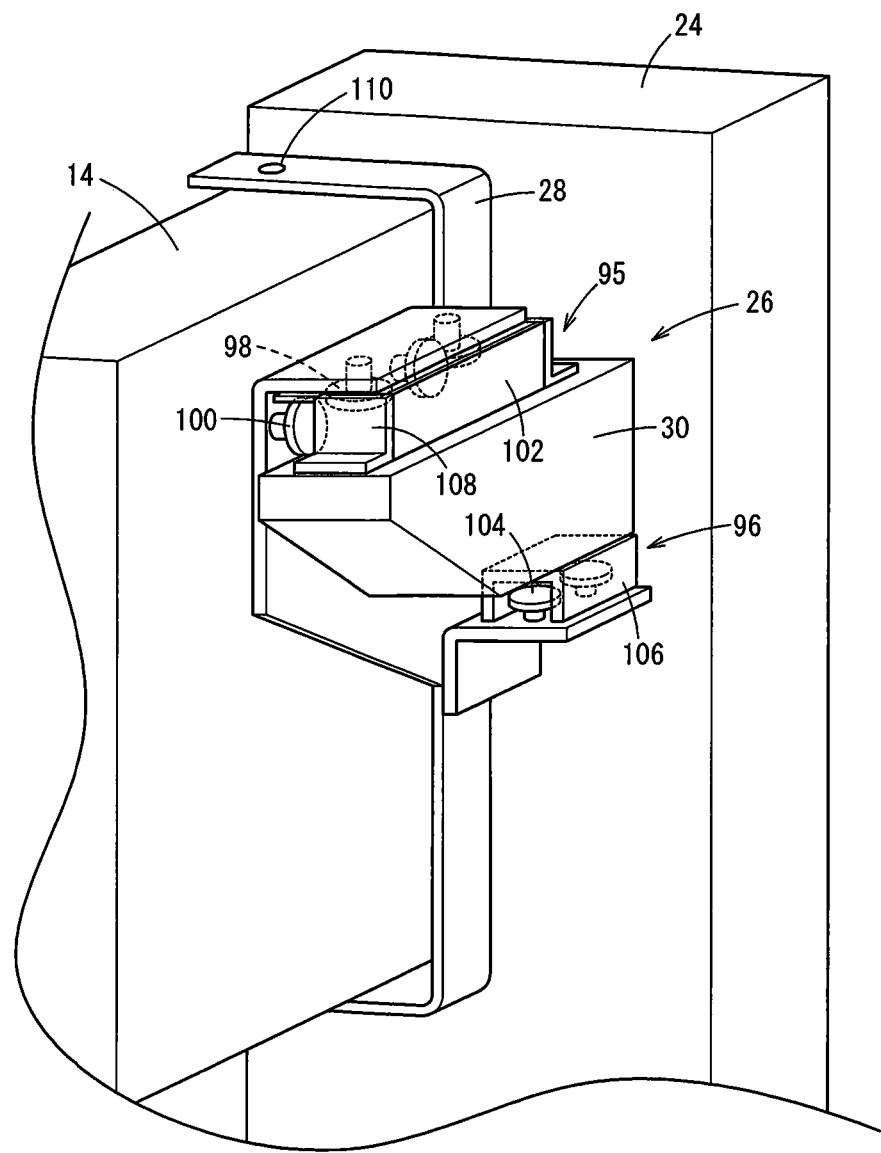
FIG. 12 is a perspective view of a display device attached to a frame as viewed from the rear side.

FIG. 12 is a perspective view of a display device 14 attached to a frame 24 as viewed from the rear side. The display device 14 is attached to the frame 24 via a support mechanism 26.

The support mechanism 26 includes a first bracket 28 attached to the display device 14, and a second bracket 30 attached to the frame 24, and further includes, between the first bracket 28 and the second bracket 30, an upper slider 95 arranged on the upper side and a lower slider 96 arranged on the lower side, with respect to the direction of gravity.

The upper slider 95 includes front-rear support rollers 98 and vertical support rollers 100, which are attached to the first bracket 28, and also includes an upper rail 102 attached to the top surface of the second bracket 30. The front-rear support roller 98 is arranged so as to be rotatable about an axis extending in a direction substantially corresponding to that of gravity. The vertical support roller 100 is arranged so as to be rotatable about an axis extending in a direction substantially perpendicular to the rear surface of the display device 14. The upper rail 102 is arranged to extend parallel to the mold opening/closing direction.

The front-rear support rollers 98 are in contact with a side surface of the upper rail 102 that extends upward in the direction of gravity, and receive a load acting in the direction (front-and-rear direction) from the front to the rear of the display device 14. The vertical support rollers 100 abut on the upper surface of the second bracket 30 and receive a load in the gravity direction (vertical direction). Thereby, the first bracket 28 is supported by the upper slider 95 so as to be movable in the mold opening/closing direction relative to the second bracket 30. Further, stoppers 108 are provided at both ends of the upper rail 102. Owing thereto, the moving range of the first bracket 28 with respect to the second bracket 30 is restricted by the stoppers 108.

The lower slider 96 includes front-rear support rollers 104 attached to the first bracket 28, and a lower rail 106 attached to the lower surface of the second bracket 30. The front-rear support rollers 104 are arranged so as to be rotatable about an axis extending in a direction substantially corresponding to that of gravity. The lower rail 106 is arranged to extend parallel to the mold opening/closing direction. The front-rear support rollers 104 abut on a side surface of the lower rail 106 that extends downward in the direction of gravity, and receive a load acting in a direction (front and rear direction) from the front to the rear of the display device 14. Thus, the first bracket 28 is supported by the lower slider 96 so as to be movable in the mold opening/closing direction relative to the second bracket 30.

As described above, the first bracket 28 is supported by the upper slider 95 and the lower slider 96 so as to be movable in the mold opening/closing direction relative to the second bracket 30. The moving range of the first bracket 28 with respect to the second bracket 30 is restricted by the stoppers 108. That is, the display device 14 is supported by the upper slider 95 and the lower slider 96 so as to be movable relative to the molding machine body 12 in a predetermined range in the mold opening/closing direction.

A hinge 110 is provided at the position where the first bracket 28 is attached to the display device 14. The display device 14 is supported by the hinge 110 so as to be rotatable about an axis extending in the direction of gravity with respect to the first bracket 28. Thereby, the display device 14 can be pivoted by the support mechanism 26 about the axis extending in the direction of gravity.

[Modification 2]

In the first and third embodiments, the display device 14 is attached to the molding machine body 12 by means of the support mechanism 26, but the operation panel 42 may be attached to the molding machine body 12 by means of a support mechanism 26. Alternatively, both the display device 14 and the operation panel 42 may be attached to the molding machine body 12 by means of a support mechanism 26.

Further, by using the support mechanism 26 of the second embodiment, only the display device 14 may be attached to the molding machine body 12 or only the operation panel 42 may be attached to the molding machine body 12.

[Modification 3]

Figure 13:
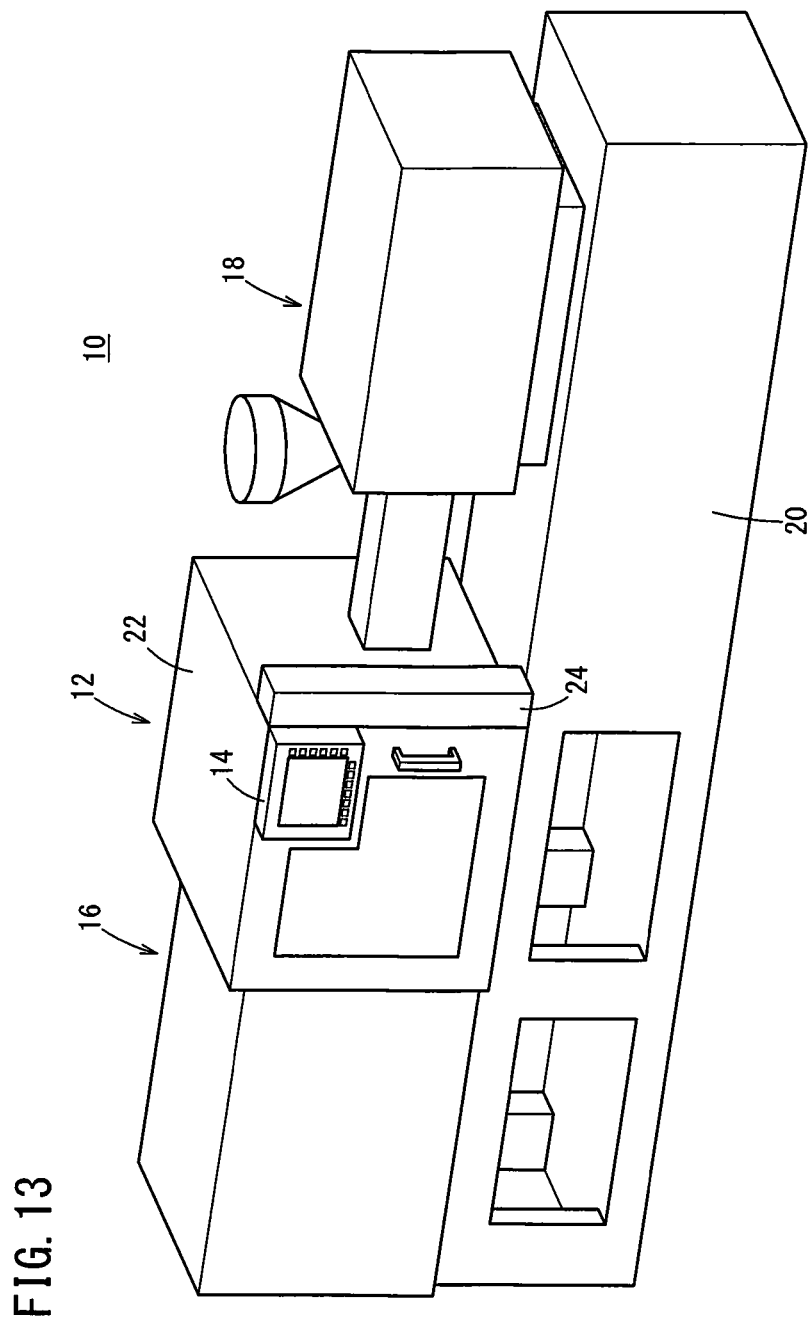
FIG. 13 is a schematic view of an injection molding machine.

FIG. 13 is a schematic view of an injection molding machine 10. In the first embodiment and the third embodiment, the display device 14 is attached to the frame 24 of the molding machine body 12. In the second embodiment, the display device 14 is attached to the stationary platen 44 of the molding machine body 12.

As another example, as shown in FIG. 13, the display device 14 may be attached to the safety door 22. When the display device 14 is attached to the safety door 22, any one of the support mechanisms 26 of the first to third embodiments may be used. Alternatively, the operation panel 42 may be attached to the safety door 22. Since the safety door 22 itself can also be opened and closed in the mold opening/closing direction, it is possible to further suppress the vibration transmitted to the display device 14 and the operation panel 42, and hence reduce the burden acting on the electronic components in the display device 14 and the operation panel 42. Here, the safety door 22 is not limited to one that covers the clamping unit 16, and may also be one that covers the injection unit 18.

[Modification 4]

The rail 36 of the first embodiment, the shaft 60 and the lower rail 68 of the second embodiment, the shaft 80 and the lower rail 88 of the third embodiment, the upper rail 102 and the lower rail 106 of Modification 1 are arranged to extend parallel to the mold opening/closing direction. Unlike this, each rail or shaft may be arranged inclined with respect to the mold opening/closing direction.

Technical Ideas Obtained from the Embodiment

Technical ideas that can be grasped from the above embodiments will be described below.

The injection molding machine (10) for molding a molded article includes: an electronic device (14, 42); and a support mechanism (26) configured to support the electronic device on a molding machine body (12). The support mechanism includes: a first bracket (28) attached to the electronic device; a second bracket (30) attached to the molding machine body; and a slider (32) provided between the first bracket and the second bracket and configured to support the first bracket so as to be movable relative to the second bracket in a mold opening and closing direction (mold opening/closing direction). As a result, it is possible to suppress the vibration transmitted to the electronic device and reduce the load on the electronic components in the electronic device.

In the above injection molding machine, the slider may include a stopper (38) configured to restrict the moving range of the first bracket. This prevents the electronic device from falling off.

In the above injection molding machine, the first bracket may include a hinge (40) configured to support the electronic device so as to be rotatable about an axis extending in the direction of gravity or in the mold opening and closing direction. This allows the user to tilt the electronic device at a desired angle.

In the above injection molding machine, the slider may include two sliders that are provided apart from each other in the direction of gravity, and the slider (72) on the upper side may include a cylindrical shaft (80) provided on the second bracket, and a carriage (76) provided on the first bracket side so as to be movable relative to the shaft in the axial direction of the shaft and so as to be relatively rotatable about the axis of the shaft, and the slider on the lower side may include a fastener member (92) configured to fix the electronic device to the second bracket at an arbitrary position where the electronic device together with the first bracket is rotated about the axis of the shaft. This allows the user to tilt the electronic device at a desired angle.

In the above injection molding machine, the electronic device may be at least one of a display device (14) for displaying information about the injection molding machine and an operation panel (42) operated by a user. As a result, it is possible to suppress the vibration transmitted to the display device and operation panel as electronic devices and reduce the load on the electronic components in the display device and operation panel.

In the above injection molding machine, the molding machine body may include a safety door (22) configured to cover at least one of the clamping unit (16) and the injection unit (18), the safety door being provided so as to be openable and closable in the mold opening and closing direction, and the electronic device may be attached to the safety door. As a result, it is possible to further suppress the vibration transmitted to the electronic device and reduce the load on the electronic components in the electronic device.

The present invention is not particularly limited to the embodiment described above, and various modifications are possible without departing from the essence and gist of the present invention.

What is claimed is:

1. An injection molding machine for molding a molded article, comprising:
   an electronic device; and
   a support mechanism configured to support the electronic device on a molding machine body, wherein the support mechanism includes:
      a first bracket attached to the electronic device;
      a second bracket attached to the molding machine body; and
      a slider provided between the first bracket and the second bracket and configured to support the first bracket so as to be movable relative to the second bracket in a mold opening and closing direction, the slider includes a stopper configured to restrict a moving range of the first bracket, the slider comprises an upper slider and a lower slider that are provided apart from each other in a direction of gravity;
   the upper slider on an upper side includes:
      a cylindrical shaft provided on the second bracket; and
      a carriage provided on the first bracket so as to be movable relative to the shaft in an axial direction of the shaft and so as to be relatively rotatable about an axis of the shaft; and
   the lower slider on a lower side includes a fastener member configured to fix the electronic device to the second bracket at an arbitrary position where the electronic device together with the first bracket is rotated about the axis of the cylindrical shaft.

2. The injection molding machine according to claim 1, wherein the first bracket includes a hinge configured to support the electronic device so as to be rotatable about an axis extending in a direction of gravity or in the mold opening and closing direction.

3. The injection molding machine according to claim 1, wherein the electronic device is at least one of a display device configured to display information about the injection molding machine and an operation panel operated by a user.

4. The injection molding machine according to claim 1, wherein:
   the molding machine body includes a safety door configured to cover at least one of the clamping unit and the injection unit, the safety door being provided so as to be openable and closable in the mold opening and closing direction; and
   the electronic device is attached to the safety door.

* * * * *